(12) United States Patent
Li

(10) Patent No.: US 12,471,091 B2
(45) Date of Patent: Nov. 11, 2025

(54) WEARABLE DEVICE AND METHOD FOR WEARABLE DEVICE TO ACQUIRE COMMUNICATION RESOURCES

(71) Applicant: Beijing Xiaomi Mobile Software Co., Ltd., Beijing (CN)

(72) Inventor: Yanhua Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 443 days.

(21) Appl. No.: 17/996,675

(22) PCT Filed: Apr. 24, 2020

(86) PCT No.: PCT/CN2020/086729
§ 371 (c)(1),
(2) Date: Oct. 20, 2022

(87) PCT Pub. No.: WO2021/212478
PCT Pub. Date: Oct. 28, 2021

(65) Prior Publication Data
US 2023/0239877 A1 Jul. 27, 2023

(51) Int. Cl.
*H04W 72/04* (2023.01)
*H04W 4/70* (2018.01)
(Continued)

(52) U.S. Cl.
CPC ........... *H04W 72/20* (2023.01); *H04W 72/12* (2013.01)

(58) Field of Classification Search
CPC ..... H04W 76/10; H04W 76/14; H04W 8/005; H04W 4/70; H04W 88/06; H04W 92/02;
(Continued)

(56) References Cited

U.S. PATENT DOCUMENTS

| 9,801,177 B2 | 10/2017 | Webb et al. |
| 10,021,689 B2 | 7/2018 | Webb et al. |

(Continued)

FOREIGN PATENT DOCUMENTS

| CN | 105657717 A | 6/2016 |
| CN | 107231826 A | 10/2017 |

(Continued)

OTHER PUBLICATIONS

International Search Report with English translation issued Dec. 29, 2020 in PCT/CN2020/086729 filed on Apr. 24, 2020, citing documents 1-5, 15-17 & 25 therein, 4 pages.

(Continued)

*Primary Examiner* — Sai Aung
(74) *Attorney, Agent, or Firm* — Oblon, McClelland, Maier & Neustadt, L.L.P.

(57) ABSTRACT

The present disclosure relates to a wearable device, a method for the wearable device to acquire communication resources, and a handheld user equipment. The method includes: sending a request message for acquiring a communication resource to the handheld user equipment; receiving the communication resource allocated by the handheld user equipment to the wearable device; and communicating with a base station on the basis of the communication resources.

16 Claims, 8 Drawing Sheets

(51) Int. Cl.
*H04W 68/00* (2009.01)
*H04W 72/12* (2023.01)
*H04W 72/20* (2023.01)

(58) Field of Classification Search
CPC ..... H04W 52/46; H04W 76/11; H04W 92/18; H04W 72/04
See application file for complete search history.

(56) References Cited

U.S. PATENT DOCUMENTS

| | | | |
|---|---|---|---|
| 10,143,422 B2 | 12/2018 | Ma et al. | |
| 10,582,496 B2 | 3/2020 | Webb et al. | |
| 2013/0258953 A1* | 10/2013 | Huang | H04W 72/20 370/329 |
| 2014/0010187 A1* | 1/2014 | Huang | H04L 67/12 370/329 |
| 2014/0056221 A1* | 2/2014 | Li | H04W 4/08 370/328 |
| 2016/0302052 A1* | 10/2016 | Xu | H04W 8/005 |
| 2016/0302247 A1* | 10/2016 | Lu | H04W 8/005 |
| 2017/0019881 A1* | 1/2017 | Cao | H04W 76/30 |
| 2018/0027475 A1* | 1/2018 | Li | H04W 76/14 455/426.1 |
| 2018/0213379 A1* | 7/2018 | Xiong | H04W 4/70 |
| 2018/0295646 A1* | 10/2018 | Faurie | H04W 72/23 |
| 2019/0141694 A1 | 5/2019 | Gupta et al. | |
| 2019/0174513 A1 | 6/2019 | Loehr et al. | |
| 2020/0214003 A1 | 7/2020 | Webb et al. | |

FOREIGN PATENT DOCUMENTS

| | | |
|---|---|---|
| CN | 107308644 A | 11/2017 |
| CN | 107919949 A | 4/2018 |
| CN | 107995636 A | 5/2018 |
| CN | 108282870 A | 7/2018 |
| CN | 108616922 A | 10/2018 |
| CN | 110178424 A | 8/2019 |
| JP | 2018-191130 A | 11/2018 |
| WO | WO 2015/018605 A1 | 2/2015 |

OTHER PUBLICATIONS

Chinese Office Action issued Sep. 9, 2022 in Chinese Patent Application No. 202080000744.7, citing documents 15- 16 & 18-20 therein, 11 pages.

Lenovo, "Views of Rel-17 NR-Light", 3GPP TSG RAN Meeting #85, RP-192018, Sep. 2019, 10 pages.

Chinese Office Action issued Aug. 8, 2023 in Chinese Application 202080000744.7, (with unedited computer-generated English translation), citing documents 1-2, 15-18 & 24-25 therein, 4 pages.

Qualcomm Incorporated, "On R16 additional enhancements to MTC LTE", 3GPP TSG-RAN WG4 Meeting #90, R4-1900326, 2019, 12 pages.

Huawei et al., "Feature lead summary of Support for transmission in preconfigured UL resources", 3GPP TSG RAN WG1 Meeting #94b, R1-1811697, 2018, 13 pages.

\* cited by examiner

WEARABLE DEVICE AND METHOD FOR WEARABLE DEVICE TO ACQUIRE COMMUNICATION RESOURCES

CROSS-REFERENCE TO RELATED APPLICATION

The present application is a U.S. National Stage of International Application No. PCT/CN2020/086729, filed on Apr. 24, 2020, the contents of all of which are incorporated herein by reference in their entireties for all purposes.

BACKGROUND OF THE INVENTION

Field of the Invention

The present disclosure relates to the field of mobile communication terminals, and in particular, to a wearable device and a method for the wearable device to acquire a communication resource.

Description of the Related Art

In the past few decades, mobile communication has experienced a rapid development from voice service to mobile bandwidth data service, which not only profoundly changes people's way of life, but also greatly promotes social and economic development. As the two main driving forces for the development of mobile communications in the future, the mobile Internet and the Internet of Things provide broad application scenarios for 5G. Facing the future, the thousand-fold increase in data traffic, hundreds of billions of device connections and diversified business demands will all pose severe challenges to 5G system design. 5G will meet people's needs for ultra-high traffic density, ultra-high connection density, and ultra-high mobility, and can provide users with extreme business experiences such as high-definition video, virtual reality, augmented reality, cloud desktop, and online games. 5G will penetrate into the Internet of Things and other fields, deeply integrate with industrial facilities, medical equipment, transportation, etc., to fully realize the "Internet of Everything", and effectively meet the information service needs of vertical industries such as industry, medical care, and transportation. 5G will also greatly improve the energy consumption, cost and efficiency of network construction and operation, comprehensively enhance service innovation capabilities, and expand the space of the mobile communication industry.

At present, the standardization of 5G has been completed. With the deployment and improvement of 5G networks, more and more mobile phone manufacturers have launched 5G mobile phones. In view of the NR-Light characteristics of R17, a new type of terminal is introduced, which is designed to cope with scenarios other than eMBB/URLLC/mMTC of R15/R16, that is the cases that the required rate, delay and reliability are not covered by the above scenarios. For example, the rate is lower than eMBB, but higher than mMTC, and the delay and reliability requirements are more relaxed than URLLC. The three typical application scenarios are factory sensors, video surveillance, and wearable devices. Therefore, it can be considered that this characteristic introduces a light terminal. This type of terminal has the following characteristics: RX is reduced, from 4 in R15 to 2 or 1; bandwidth is reduced, the typical value of FR1 is 5 MHz/10 MHz, while the typical value of FR2 is 40 MHz; UE processing capacity is reduced; smaller TB size and DCI size will be possibly supported.

SUMMARY OF THE INVENTION

According to a first aspect of the present disclosure, there is provided a method for a wearable device to acquire a communication resource. The method includes: sending a request message for acquiring the communication resource to a handheld user equipment; receiving the communication resource allocated by the handheld user equipment for the wearable device; and communicating with a base station based on the allocated communication resource.

According to a second aspect of the present disclosure, there is provided a method for a handheld user equipment to allocate a communication resource, the method includes: receiving a first request message for acquiring the communication resource from a wearable device; and sending the allocated communication resource to the wearable device in response to the first request message.

According to a third aspect of the present disclosure, there is provided a wearable device. The wearable device includes: a memory, storing a computer-executable instruction thereon; and one or more processors coupled to the memory, when the computer-executable instruction is executed by the one or more processors, cause to send a request message for acquiring the communication resource to a handheld user equipment; receive the communication resource allocated by the handheld user equipment for the wearable device; and communicate with a base station based on the allocated communication resource.

According to a fourth aspect of the present disclosure, there is provided a handheld user equipment, including: a memory, storing a computer-executable instruction thereon; and one or more processors, coupled to the memory, when the computer-executable instruction is executed by the one or more processors, cause to receive a first request message for acquiring the communication resource from a wearable device; and send the allocated communication resource to the wearable device in response to the first request message.

According to a fifth aspect of the present disclosure, there is provided a computer-readable storage medium, storing a computer program thereon, when the program is executed by a processor, any one of the above methods is implemented.

It is to be understood that the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure.

Figure 1:
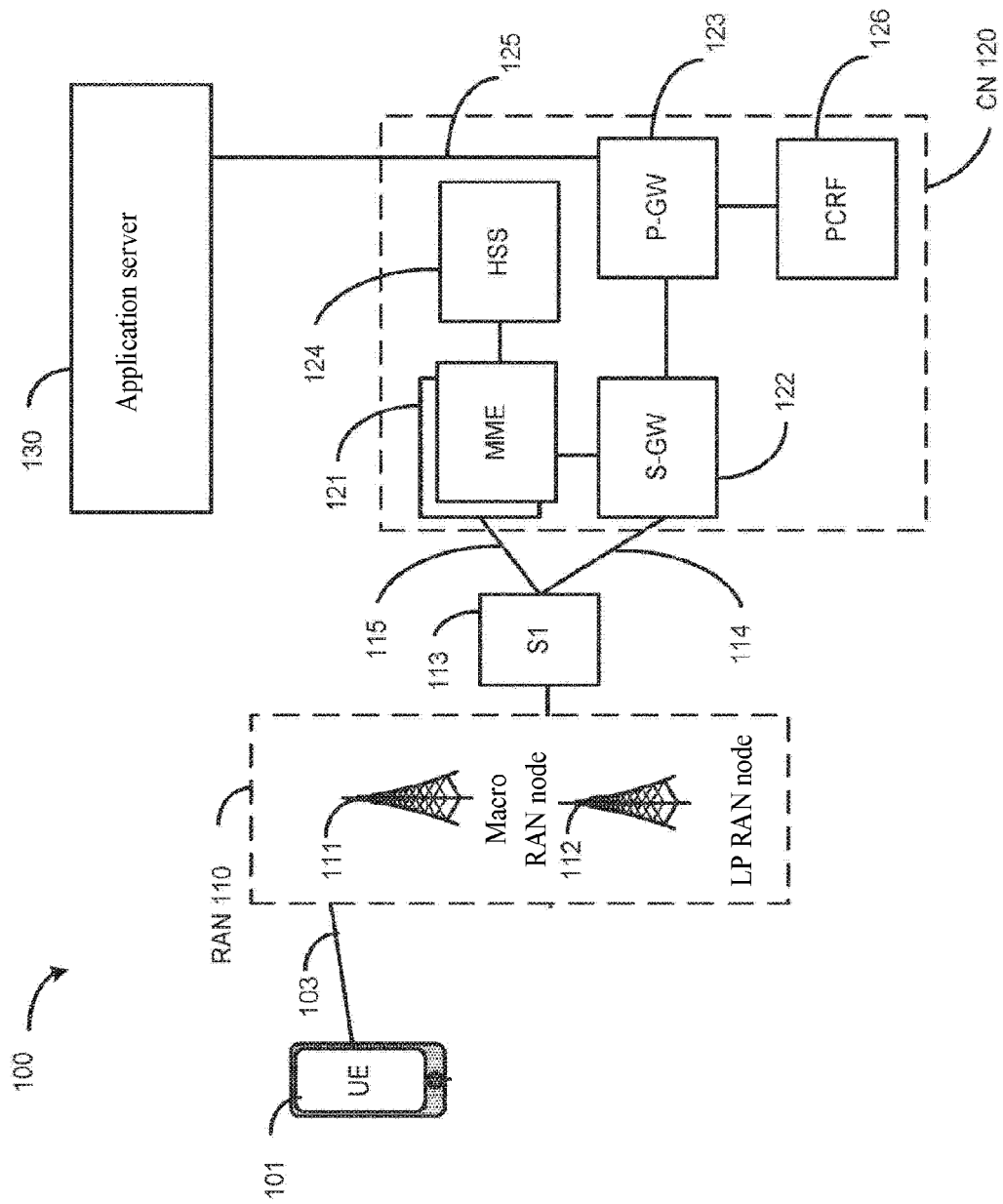
FIG. 1 shows a block diagram of a wireless network according to an embodiment of the present disclosure.

From the foregoing drawings, there have been shown specific embodiments of the present disclosure, which will be described in greater detail hereinafter. These drawings and written descriptions are not intended to limit the scope of the disclosed concepts in any way, but rather to illustrate the disclosed concepts to those skilled in the art by referring to specific embodiments.

DETAILED DESCRIPTION OF THE PREFERRED EMBODIMENTS

Embodiments of the present disclosure are described in detail below, examples of which are illustrated in the accompanying drawings, where the same or similar reference numerals refer to the same or similar elements or elements having the same or similar functions throughout. The embodiments described below with reference to the accompanying drawings are exemplary and are only used to explain the present disclosure, but not to be construed as a limitation of the present disclosure.

It will be understood by those skilled in the art that the singular forms "a", "an", "the" and "the" as used herein can include the plural forms as well, unless expressly stated otherwise. It should be further understood that the word "including" used in the specification of the present disclosure refers to the presence of the stated features, integers, steps, operations, elements and/or components, but does not preclude the presence or addition of one or more other features, integers, steps, operations, elements, components and/or groups thereof. It will be understood that when we refer to an element as being "connected" or "coupled" to another element, it can be directly connected or coupled to the other element or intervening elements may also be present. Furthermore, "connected" or "coupled" as used herein may include wirelessly connected or wirelessly coupled. As used herein, the term "and/or" includes all or any element and all combinations of one or more of the associated listed items.

FIG. 1 shows the architecture of a system 100 of a network according to an embodiment of the present disclosure. System 100 is shown including a handheld user equipment (UE) 101. UE 101 is shown as a smartphone, but may also include any mobile or non-mobile computing device, such as a personal data assistant (PDA), pager, laptop, desktop, wireless handheld, or any computing device that includes a wireless communication interface.

In some embodiments, UE 101 may include an internet of things (IoT) UE, which may include a network access layer designed for low-power IoT applications utilizing short-term UE connections. IoT UEs may utilize technologies such as machine-to-machine (M2M) or machine-type communication (MTC) to exchange data with MTC servers or devices via public land mobile networks (PLMN), proximity services (ProSe) or device-to-device (D2D) communication, sensor networks or IoT networks. M2M or MTC data exchanges can be machine-initiated data exchanges. An IoT network describes interconnected IoT UEs, which may include uniquely identifiable embedded computing devices (within the Internet infrastructure) with short-lived connections. IoT UEs can execute background applications to facilitate the connection of IoT networks.

UE 101 may be configured to connect with a radio access network (RAN) 110—RAN 110 may be, for example, an evolved universal mobile telecommunications system (UMTS) terrestrial radio access network (E-UTRAN), NextGen RAN (NG RAN), or other type RAN. UE 101 utilizes connection 103, which includes a physical communication interface or layer; in this example, connection 103 is shown as an air interface for enabling communication coupling, and may conform to a cellular communication protocol, such as the global system for mobile communications (GSM) protocol, code division multiple access (CDMA) network protocol, push to talk (PTT) protocol, PTT over cellular (POC) protocol, universal mobile telecommunications system (UMTS) protocol, 3GPP long term evolution (LTE) protocol, Fifth generation (5G) protocol, new radio (NR) protocol, etc.

In some embodiments, UE 101 can also exchange communication data directly via a ProSe interface. The ProSe interface may alternatively be referred to as a sidelink interface, which includes one or more logical channels including, but not limited to, physical sidelink control channel (PSCCH), physical sidelink shared channel (PSSCH), physical sidelink discovery channel (PSDCH) and physical sidelink broadcast channel (PSBCH).

RAN 110 may include one or more access nodes enabling connection 103. These access nodes (AN) may be referred to as base stations (BS), NodeB, evolved NodeB (eNB), next generation NodeB (gNB), RAN nodes, etc., and may include terrestrial stations (e.g. terrestrial access point) providing coverage within a geographic area (e.g. cell) or satellite stations. RAN 110 may include one or more RAN nodes (e.g. macro RAN node 111) for providing macro cells and one or more RAN nodes (e.g. low power (LP) RAN node 112) for providing femto cells or pico cells (e.g. cells with smaller coverage area, smaller user capacity or higher bandwidth, compared with macro cells).

Any one of RAN node 111 and 112 may terminate the air interface protocol and may be a first contact node for the UE 101. In some embodiments, either of RAN node 111 and 112 may perform various logical functions of RAN 110, including but not limited to radio network controller (RNC) functions such as radio bearer management, uplink and downlink Dynamic radio resource management and data packet scheduling and mobility management.

According to some embodiments, UE 101 may be configured to: according to various communication techniques (such as, but not limited to, orthogonal frequency division multiple access (OFDMA) communication technique (e.g. for downlink communication) or single carrier frequency division multiple access (SC-FDMA) communication technique (e.g. for uplink and ProSe or sidelink communication), communicate with each other or to any one of RAN node 111 and 112 using orthogonal frequency division multiplexing (OFDM) communication signals over a multi-carrier communication channel, but the scope of the embodiments is not limited to this. An OFDM signal may include multiple orthogonal sub-carriers.

In some embodiments, a grid of downlink resources may be used for downlink transmission from any one of RAN node 111 and 112 to UE 101, while uplink transmission may utilize similar techniques. The grid may be a time-frequency grid called resource grid or a time-frequency resource grid, which is the physical resource in each time slot in the downlink. This time-frequency plane representation is a common practice in OFDM systems, which makes radio resource allocation intuitive. Each column and each row of the resource grid corresponds to one OFDM symbol and one OFDM subcarrier, respectively. The duration of the resource grid in the time domain corresponds to one slot in the radio frame. The smallest time-frequency unit in the resource grid is called resource element. Each resource grid includes a number of resource blocks, which describe the mapping of certain physical channels to resource elements. Each resource block includes a set of resource elements; in the frequency domain, this may represent the smallest amount of resources that can currently be allocated. There are several different physical downlink channels transmitted using such resource blocks.

The physical downlink shared channel (PDSCH) may carry user data and higher layer signaling to the UE 101. The physical downlink control channel (PDCCH) may carry information about the transport format and resource allocation related to the PDSCH channel, among others. It can also inform UE 101 of transport format, resource allocation and H-ARQ (Hybrid Automatic Repeat Request) information related with uplink shared channel. In general, downlink scheduling ((allocating control channel resource blocks and shared channel resource blocks to UE 101 in the cell) can be performed at any one of RAN node 111 and 112 based on the channel quality information fed back from any one of UE 101. Downlink resource assignment information may be sent on each of the PDCCH for (e.g. assigned to) UEs 101.

PDCCH may use control channel elements (CCE) to convey control information. Before being mapped to resource elements, PDCCH complex-valued symbols may first be organized into quadruples, which may then be arranged using a subblock interleaver for rate matching. Each PDCCH may be transmitted using one or more of these CCEs, where each CCE may correspond to nine groups of four physical resource elements called resource element groups (REG). Four quadrature phase shift keying (QPSK) symbols can be mapped to each REG. PDCCH may be transmitted using one or more CCEs, depending on the size of the downlink control information (DCI) and channel conditions. Four or more different PDCCH formats can be defined in LTE with different numbers of CCEs (e.g., aggregation levels, L=1, 2, 4 or 8).

Some embodiments may use concepts that are extensions of the above concepts for resource allocation for control channel information. For example, some embodiments may utilize an enhanced physical downlink control channel (EPDCCH), which uses PDSCH resources for control information transmission. EPDCCH may be transmitted using one or more enhanced control channel elements (ECCE). Similar to the above, each ECCE may correspond to nine groups of four physical resource elements called enhanced resource element groups (EREG). In some cases, ECCE can have other numbers of EREG.

RAN 110 is shown as coupled to core network (CN) 120 communicatively via S1 interface 113. In some embodiments, CN 120 may be an evolved packet core (EPC) network, a next generation packet core (NPC) network, or some other type of CN. In some embodiments, S1 interface 113 is divided into two parts: S1-U interface 114, which carries traffic data between RAN nodes 111 and 112 and serving gateway (S-GW) 122; and S1 mobility management entity (MME) interface 115, which is the signaling interface between RAN nodes 111 and 112 and MME 121.

In some embodiments, CN 120 includes MME 121, S-GW 122, packet data network (PDN) gateway (P-GW) 123 and home subscriber server (HSS) 124. MME 121 may be functionally similar to the control plane of the legacy service general packet radio service (GPRS) support node (SGSN). MME 121 may manage mobility aspects of access, such as gateway selection and tracking area list management. HSS 124 may include a database for network users, including subscription-related information used to support network entities in handling communication sessions. CN 120 may include one or more HSSs 124, depending on the number of mobile subscribers, the capacity of the equipment, the organization of the network, and the like. For example, HSS 124 may provide support for routing/roaming, authentication, authorization, naming/addressing solutions, location dependencies, and the like.

S-GW 122 may terminate S1 interface 113 to RAN 110 and route data packets between RAN 110 and CN 120. Additionally, S-GW 122 may be a local mobility anchor for node switching between RANs, and may also provide anchoring for mobility between 3GPPs. Other responsibilities can include legal interception, charging and some kinds of policy enforcement.

P-GW 123 may terminate SGi interface to PDN. P-GW 123 may route data packets between EPC network 123 and an external network (e.g., a network including application server 130 (alternatively referred to as an application function (AF)) via internet protocol (IP) interface 125. The application server 130 may be an element that provides applications (e.g., UMTS packet service (PS) domain, LTE PS data services, etc.) using IP bearer resources to the core network. In some embodiments, P-GW 123 is shown as being communicatively coupled to application server 130 via IP communication interface 125. Application server 130 may also be configured to support one or more communication services for UE 101 via CN 120.

P-GW 123 may also be a node for policy enforcement and charging data collection. Policy and Charging Rules Function (PCRF) 126 is the policy and charging control element of CN 120. In a non-roaming scenario, there may be a single PCRF associated with the UE's Internet Protocol Connectivity Access Network (IP-CAN) session in the home public land mobile network (HPLMN). In a roaming scenario where services are off-premises, there may be two PCRFs associated with the UE's IP-CAN session: the home PCRF (H-PCRF) within the HPLMN and the visited PCRF (V-PCRF) within the visited public land mobile network (VPLMN). PCRF). PCRF 126 may be communicatively coupled to application server 130 via P-GW 123. The application server 130 may inform the PCRF 126 with signals to indicate the new service flow and select the appropriate quality of service (QoS) and charging parameters. PCRF 126 may provide this rule to a policy and charging enforcement function (PCEF) with appropriate traffic flow template (TFT) and QoS class identifier (QCI), which initiates the QoS and charging specified by application server 130.

Figure 2:
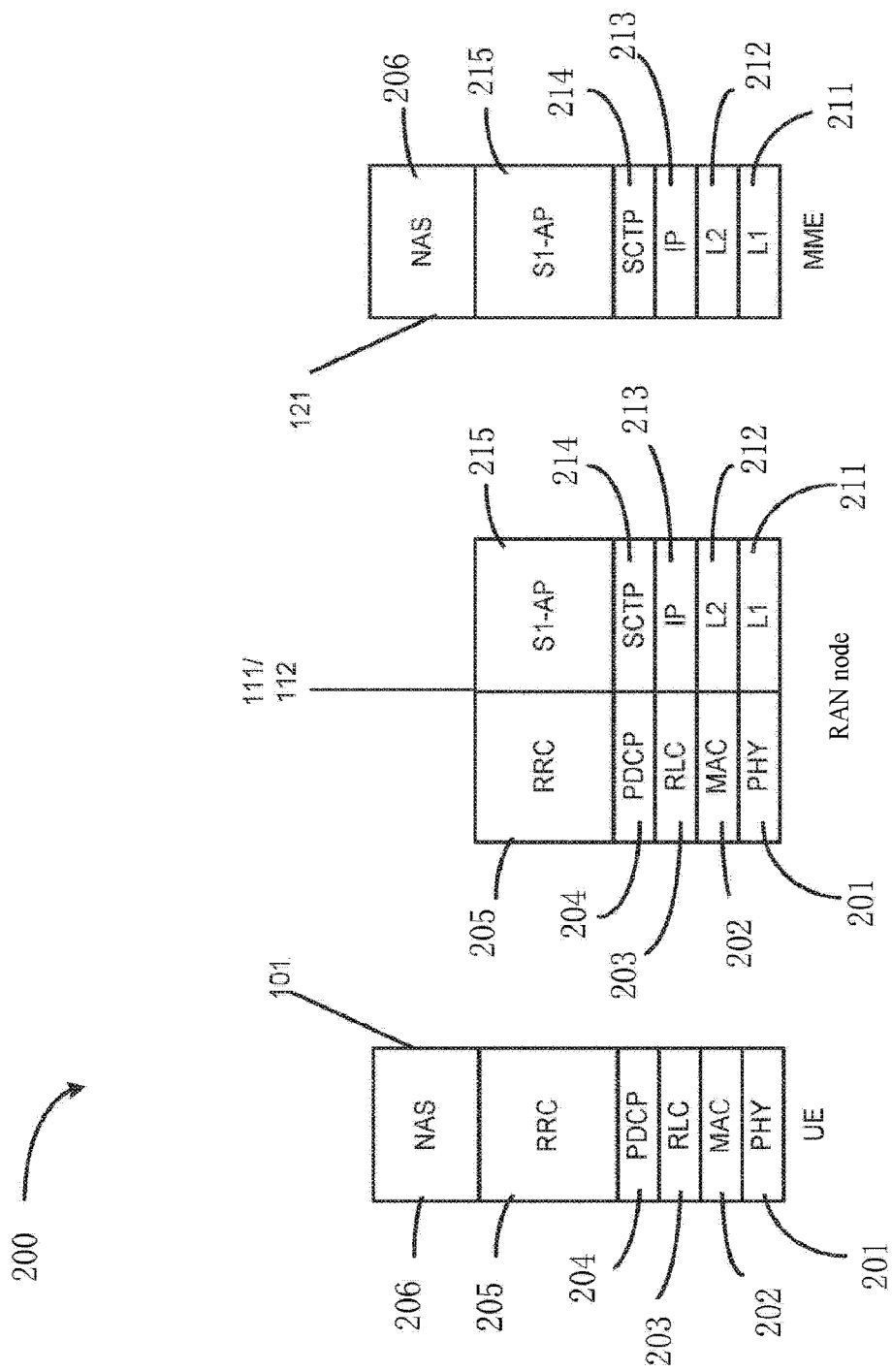
FIG. 2 shows a schematic diagram of a control plane protocol stack according to an embodiment of the present disclosure.

FIG. 2 is an illustration of a control plane protocol stack according to an embodiment of the present disclosure. In some embodiments, the control plane 200 is shown as a communication protocol stack between UE 101, RAN node 111 (or LP RAN node 112) and MME 121.

PHY layer 201 may send or receive information used by MAC layer 202 through one or more air interfaces. PHY layer 201 may also perform link adaptation or adaptive modulation and coding (AMC), power control, cell search, and other measurements used by higher layers such as RRC layer 205. PHY layer 201 may still further perform error detection on transmission channels, forward error correction (FEC) encoding/decoding of transmission channels, modulation/demodulation of physical channels, interleaving, rate matching, mapping to physical channels, and multiple input multiple Output (MIMO) antenna processing.

MAC layer 202 may perform mapping between logical channels and transmission channels, multiplexing MAC service data units (SDU) from one or more logical channels into transmission blocks (TB) for delivery to PHY layer 201 via transmission channels, demultiplexing MAC SDU from transmission blocks (TB) delivered from PHY layer 201 via transmission channels to one or more logical channels, multiplexing MAC SDU into TB, scheduling information reporting, error correction via Hybrid Automatic Repeat Request (HARQ), and logical channel prioritization.

RLC layer 203 may operate in various modes of operation, including: transparent mode (TM), unacknowledged mode (UM), and acknowledged mode (AM). RLC layer 203 may perform transmission of upper layer protocol data units (PDU), error correction through automatic repeat request (ARQ) in order to be used for AM data transmission, and perform concatenation, fragmentation and reassembly of RLC data SDU in order to be used for UM and AM data transmission. RLC layer 203 may also perform re-segmentation of RLC data PDU in order to be used for AM data transmission, reorder RLC data PDU in order to be used for UM and AM data transmission, detect duplicate data in order to be used for UM and AM data transmission, discard RLC SDU in order to be used for UM and AM data transmission, detect protocol errors in order to be used for AM data discard, and perform RLC reconstruction.

PDCP layer 204 may perform header compression and decompression of IP data, maintain PDCP Sequence Number (SN), perform sequential delivery of upper layer PDU when re-establishing lower layers, eliminate duplication of lower layer SDU for radio bearers mapped on RLC AM when lower layers are re-established, encrypt and decrypt control plane data, perform integrity protection and integrity verification of control plane data, control timer-based data discarding, and perform security operations.

The main services and functions of RRC layer 205 may include broadcasting of system information (e.g., included in a master information block (MIB) or a system information block (SIB) associated with the non-access stratum (NAS)); broadcasting of system information related to the access stratum (AS); paging, establishment, maintenance and release of RRC connection between UE and E-UTRAN (e.g., RRC connection paging, RRC connection establishment, RRC connection modification and RRC connection release); establishment, maintenance and release of point-to-point radio bearers; security functions; measurement configuration of different-Radio Access Type (RAT) mobility and UE measurement reporting. The MIB and SIB may include one or more information elements (IE), each of which may include a separate data field or data structure.

UE 101 and RAN node 111 may utilize a Uu interface (e.g., LTE-Uu interface) to exchange control plane data via protocol stacks (including PHY layer 201, MAC layer 202, RLC layer 203, PDCP layer 204, and RRC layer 205).

In some embodiments, the non-access stratum (NAS) protocol 206 forms the highest layer of the control plane between UE 101 and MME 121. NAS protocol 206 supports the mobility and session management procedures of UE 101 to establish and maintain the IP connection between UE 101 and P-GW 123.

S1 application protocol (S1-AP) layer 215 may support the functionality of S1 interface and include elementary procedures (EP). EP is the unit of interaction between RAN node 111 and CN 120. S1-AP layer services may include two groups: UE associated services and non-UE associated services. These services perform functions including but not limited to: E-UTRAN radio access bearer (E-RAB) management, UE capability indication, mobility, NAS signaling transmission, RAN information management (RIM) and configuration delivery.

Stream control transmission protocol (SCTP) layer 214 may ensure reliable delivery of signaling messages between RAN node 111 and MME 121 based in part on IP protocol supported by IP layer 213. L2 layer 212 and L1 layer 211 may refer to the communication links used by RAN node and MME to exchange information.

RAN node 111 and the MME 121 may utilize S1-MME interface to exchange control plane data via the protocol stack, including L1 layer 211, L2 layer 212, IP layer 213, SCTP layer 214 and S1-AP layer 215.

Figure 3:
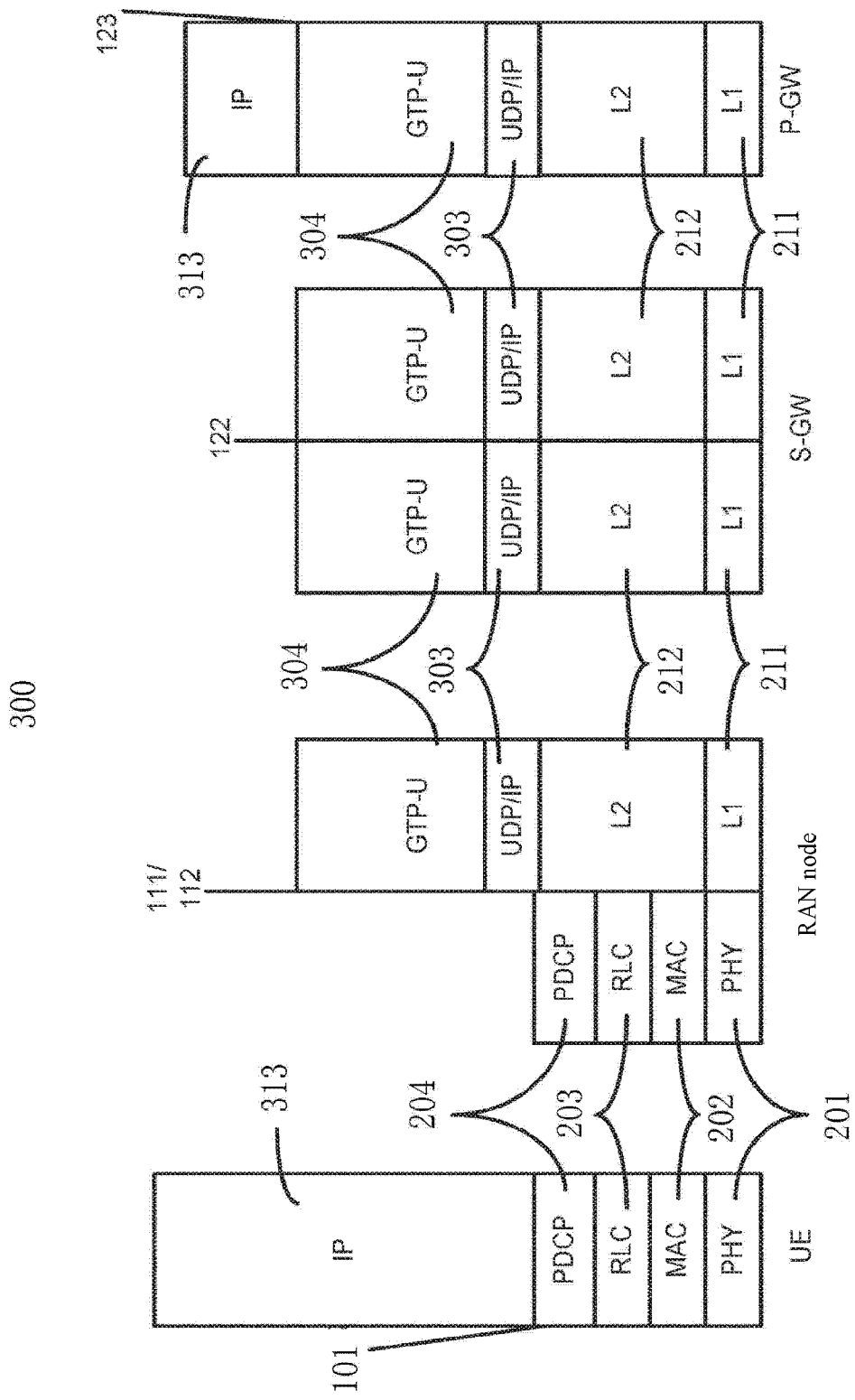
FIG. 3 shows a schematic diagram of a user plane protocol stack according to an embodiment of the present disclosure.

FIG. 3 is an illustration of a user plane protocol stack according to an embodiment of the present disclosure. In some embodiments, user plane 300 is shown as a communication protocol stack among UE 101, RAN node 111 (or LP RAN node 112), S-GW 122 and P-GW 123. User plane 300 may utilize at least some protocol layers the same as control plane 200. For example, UE 101 and RAN node 111 may utilize a Uu interface (e.g., LTE-Uu interface) to exchange user plane data via protocol stacks, including PHY layer 201, MAC layer 202, RLC layer 203, and PDCP layer 204.

General packet radio service (GPRS) tunneling protocol for the user plane (GTP-U) layer 304 may be used to carry user data within the GPRS core network and between the radio access network and the core network. For example, the transmitted user data may be packets in any format of IPv4, IPv6 or PPP formats. UDP and IP security (UDP/IP) layer 303 may provide verification for data integrity, port numbers for addressing different functions at source and destination, and encryption and authentication of selected data streams. RAN node 111 and S-GW 122 may utilize S1-U interface to exchange user plane data via protocol stacks, including L1 layer 211, L2 layer 212, UDP/IP layer 303 and GTP-U layer 304. S-GW 122 and P-GW 123 may utilize S5/S8a interface to exchange user plane data via protocol stacks, including L1 layer 211, L2 layer 212, UDP/IP layer 303 and GTP-U layer 304. As discussed above with respect to FIG. 2, the NAS protocol supports the mobility and session management procedures of UE 101 to establish and maintain IP connections between UE 101 and P-GW 123.

For an NR-light terminal (for example, a wearable device), the transmitted data packets may not be large. In this case, in order to reduce signaling overhead, an unlicensed transmission method can be used. In the narrowband service of R15, unlicensed data transmission in idle state, that is, PUR (preconfigured uplink resource) transmission has been introduced. A key feature of PUR transmission is that the terminal must have an available TA value, so that data can be transmitted directly without the signaling process of data transmission. Especially for wearable devices such as watches, their transmission traffic will be very small at most of time.

When an existing wearable device acquires data, it usually needs to directly acquire a communication resource from a base station, which leads to problems such as an overly complex structure and a large size of the wearable device. The purpose of the embodiments of the present disclosure is to solve at least one of the above-mentioned technical defects, and the following technical solutions are specially proposed.

Figure 4:
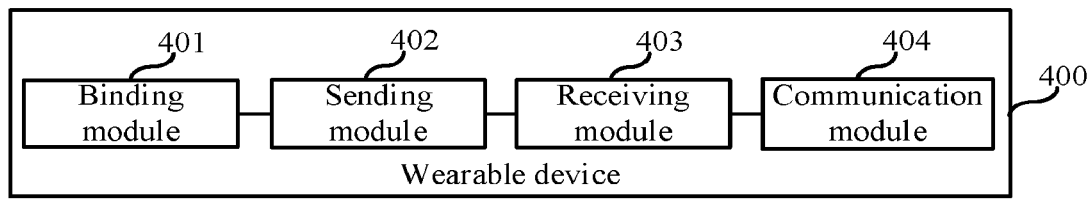
FIG. 4 shows a schematic structural diagram of a wearable device according to an embodiment of the present disclosure.

FIG. 4 shows a schematic structural diagram of a wearable device 400 according to an embodiment of the present disclosure. Since the transmission traffic of the wearable device 400 may be very small at most of time, considering that the position of the wearable device 400 relative to the user's handheld device (UE) is usually a relatively fixed relationship, the user's handheld device can be used to assist the wearable device in scheduling to reduce the control signaling overhead acquired for the wearable device in the scheduling process. The signaling overhead of the wearable device is thus saved, and its complexity is reduced.

As shown in FIG. 4, wearable device 400 may include a binding module 401, a sending module 402, a receiving module 403 and a communication module 404. The binding module 401 can be bound with a handheld user equipment (UE) by a predetermined communication manner. The sending module 402 may be configured to send a request message for acquiring a communication resource to the handheld user equipment (UE), where the communication resource include at least one of a time domain resource, a frequency domain resource and a space domain resource for communication with the base station. The receiving module 403 may be configured to receive the allocated communication resource sent by the handheld user equipment. The communication module 404 may be configured to communicate with the base station based on the allocated communication resource.

In some embodiments, the predetermined communication manner used by the wearable device 400 to be bound with the handheld user equipment may include Bluetooth, WiFi, NFC near field communication, and the like.

In some embodiments, the wearable device 400 establishes a binding connection with the handheld user equipment by the predetermined communication manner via a predetermined application layer protocol.

In some embodiments, when requesting resources to its bound handheld user equipment (for example, UE 101 in FIG. 1) through near-field communication, the wearable device 400 needs to carry relevant information such as: a) the wearable device 400 identifier (ID); b) the amount of data waiting to be transmitted; c) the estimated transmission time; d) the service characteristic: which can be a packet interval, a packet size, etc.; e) logical channel ID; f) TA to be acquired; g) the wearable device requesting to acquire resources; and h) PUR resources (including periodic PUR resources, one-time use of PUR resources).

In some embodiments, the wearable device 400 may perform data transmission with the base station in an idle state and/or an inactive state based on PUR resources.

According to some embodiments of the present disclosure, the wearable device 400 may include a memory and one or more processors. The memory stores computer-executable instructions. The one or more processors are coupled to the memory, and the computer-executable instructions, when executed by the one or more processors, cause to: send a request message for acquiring a communication resource to the handheld user equipment, receive the communication resources allocated by the handheld user equipment for the wearable device, and communicate with the base station based on the allocated communication resource.

Figure 5:
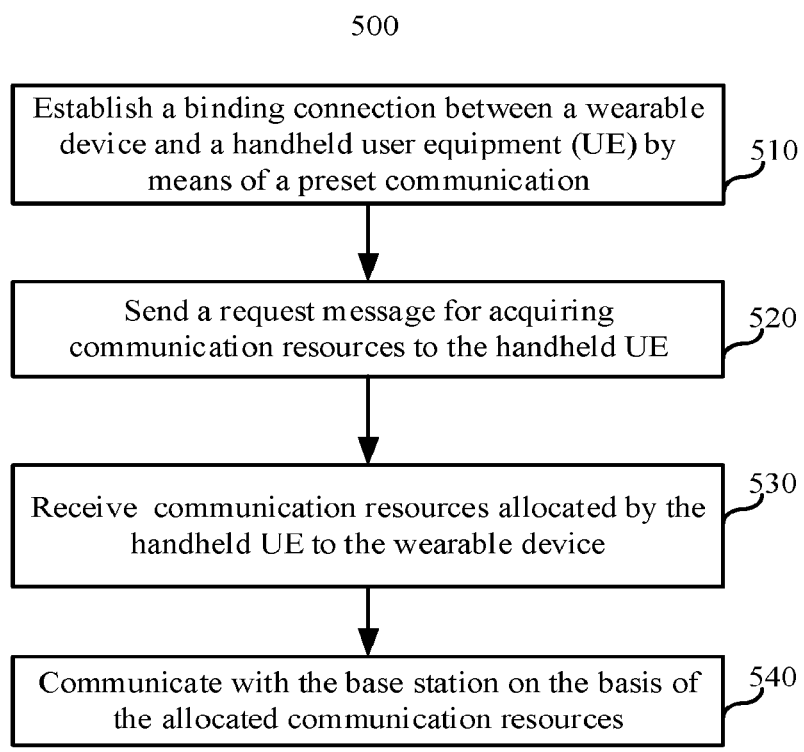
FIG. 5 shows a flowchart of a method for a wearable device to acquire a communication resource according to an embodiment of the present disclosure.

FIG. 5 shows a flowchart of a method 500 for a wearable device to acquire a communication resource according to an embodiment of the present disclosure. The method includes establishing 510 a binding connection between the wearable device and the handheld user equipment (UE) by a predetermined communication manner. After the binding connection is established, the wearable device sends 520 a request message for acquiring a communication resource to the handheld user equipment. Then, the wearable device receives 530 the communication resource allocated by the handheld user equipment for it; and based on the allocated communication resource, it communicates 540 with the base station.

In some embodiments, the predetermined communication manner used by the wearable device bound to the handheld user equipment may include Bluetooth, WiFi, NFC near field communication, and the like.

In some embodiments, the wearable device establishes a binding connection with the handheld user equipment through a predetermined application layer protocol by the predetermined communication manner.

In some embodiments, when requesting resources to its bound handheld user equipment (for example, UE 101 in FIG. 1) through near-field communication, the wearable device needs to carry relevant information such as: a) the wearable device 400 identifier (ID); b) the amount of data waiting to be transmitted; c) the estimated transmission time; d) the service characteristic: which can be a packet interval, a packet size, etc.; e) the logical channel ID; f) TA to be acquired; g) the wearable device requesting to acquire resources; and h) PUR resources (including periodic PUR resources, one-time use of PUR resources).

In some embodiments, the wearable device may perform data transmission with the base station in an idle state and/or an inactive state based on the PUR resource.

In some embodiments, the communication resource may include at least one of a time domain resources, a frequency domain resource and a space domain resource for communicating with the base station.

In addition, in some embodiments, the communication resource further includes a preconfigured uplink resource PUR, and according to the PUR resource, data transmission is performed with the base station in an idle state and/or an inactive state.

In some embodiments, the communication resource may include a TA value for communication with the base station. After acquiring the TA value of the base station, the wearable device communicates with the base station based on the TA value.

Figure 6:
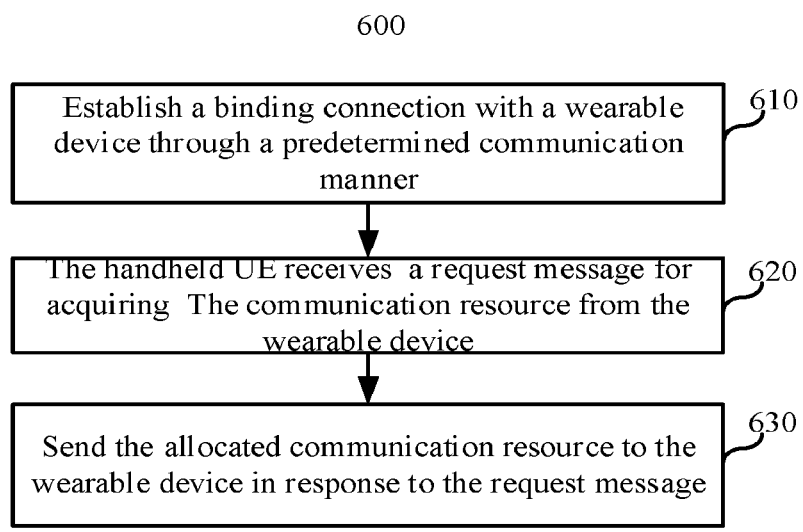
FIG. 6 shows a flowchart of a method for a handheld user equipment to allocate a communication resource according to an embodiment of the present disclosure.

FIG. 6 shows a flowchart of a method 600 for a handheld user equipment to allocate the communication resource according to an embodiment of the present disclosure. The method includes establishing 610 a binding connection with the wearable device by a predetermined communication manner. After the binding connection is established, the handheld user equipment receives 620 a request message for acquiring the communication resource from the wearable device; and in response to the request message, the allocated communication resource 630 is sent 630 to the wearable device.

In some embodiments, the predetermined communication manner used for binding the handheld user equipment with the wearable device may include Bluetooth, WiFi, NFC near field communication, and the like.

In some embodiments, the handheld user equipment establishes a binding connection with the wearable device through a predetermined application layer protocol by the predetermined communication manner.

In some embodiments, the handheld user equipment will allocate the resource for the wearable device after receiving the request from the wearable device or detecting the binding of the wearable device. The manner, in which the handheld user equipment allocates the resource for the wearable device, includes that the handheld user equipment changes a part of the resource having been acquired to the resource used by the wearable device.

Specifically, the handheld user equipment will send a resource change request to the base station, and then receive a change response (approval or rejection) from the base station. The resource change request sent by the handheld user equipment to the base station may include: a) the identifier of the wearable device, including ID or index; b) the amount of data waiting to be transmitted; c) the estimated transmission time; d) the service characteristic: a packet interval, a packet size, etc.; e) the logical channel ID; and f) which part of the resource to be changed to the wearable device resource.

In some embodiments, the handheld user equipment can change a part of the acquired grant-free resource to the PUR resource used by the handheld terminal.

In a possible implementation manner, receiving the communication resource allocated by the handheld user equipment for the wearable device includes receiving the applied communication resource sent by the handheld user equipment, where the applied communication resource is the communication resource applied by the handheld user equipment to the base station for the wearable device.

When the handheld user equipment re-applies the resource to be used for the wearable device, the request information sent to the base station may include: a) the nature of the requested resource (for example, the request for its bound wearable device), alternatively carrying the ID or index of its bound wearable device; b) the amount of data to be transmitted; c) the estimated transmission time; d) the service characteristic: a packet interval, a packet size, etc.; e) the logical channel ID; and f) the requested TA value.

In some embodiments, the resource that the wearable device acquires and communicates with the base station by means of near field communication includes TA. At this time, the wearable device directly utilizes the TA of its bound handheld terminal or adds an offset value to its TA technology to communicate with the base station. The offset value may be notified by the network in advance.

Figure 7:
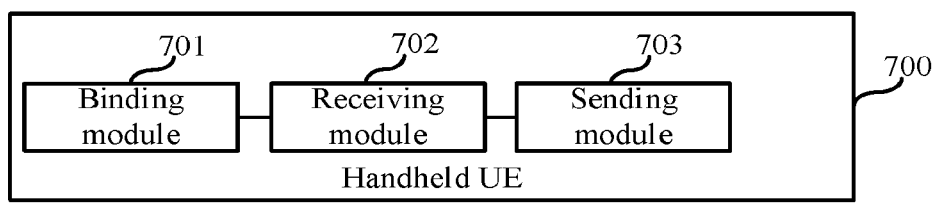
FIG. 7 shows a schematic structural diagram of a handheld user equipment according to an embodiment of the present disclosure.

FIG. 7 shows a schematic structural diagram of a handheld user equipment 700 (e.g., the UE in FIG. 1) according to an embodiment of the present disclosure. As shown in FIG. 7, the handheld user equipment 700 may include a binding module 701, a receiving module 702 and a sending module 703. The binding module 701 may be configured to bind with a wearable device (UE) by a predetermined communication manner. The receiving module 702 may be configured to receive a request message from the wearable device for acquiring a communication resource. The sending module 703 may be configured to send the allocated communication resource to the wearable device in response to the request message.

In some embodiments, the predetermined communication manner used by the handheld user equipment 700 and the wearable device may include Bluetooth, WiFi, NFC near field communication, and the like.

In some embodiments, the manner through which the handheld user equipment 700 allocates the communication resource for the wearable device includes changing at least a part of the communication resource acquired by the handheld user equipment 700 to the communication resource used by the wearable device.

In some embodiments, the changing includes changing at least a part of the grant-free resource acquired by the handheld user equipment to the PUR resource used by the handheld user equipment 700.

In some embodiments, a communication resource change request is sent to the base station through the handheld user equipment 700, the change request including at least the wearable device identifier (ID) or index; a change response is received from the base station; and at least a part of the communication resource acquired by the handheld user equipment is changed to the communication resource of the wearable device.

In some embodiments, the change request further includes at least one of the following: the wearable device identifier, the amount of data to be transmitted, the estimated transmission time, the service characteristic, the logical channel identifier ID, the requested TA, and the changed communication resource, where the service characteristic includes at least one of packet interval and packet size.

In some embodiments, a request for acquiring the communication resource is sent to a base station through the handheld user equipment 700, where the request for acquiring the communication resource at least includes an indication representing that the requested communication resource is for the wearable device, and the ID or index of the wearable device; a first response message is received from the base station; and a second response message is sent to the wearable device through the handheld user equipment based on the first response message.

In some embodiments, the request for acquiring the communication resource further includes at least one of the following: the amount of data to be transmitted, the estimated transmission time, the service characteristic, the logical channel identifier ID, and the requested TA; where, the service characteristic includes at least one of packet interval and packet size.

In some embodiments, the communication resource includes at least one of a time domain resource, a frequency domain resource and a space domain resource for communication with the base station.

According to embodiments of the present disclosure, the handheld user equipment 700 may include memory and one or more processors. The memory stores computer-executable instructions. The one or more processors are coupled to the memory and, when executed by the one or more processors, the computer-executable instructions cause to receive a request message from the wearable device to acquire a communication resource, and send the allocated communication resource to the wearable device in response to the request message.

Figure 8:
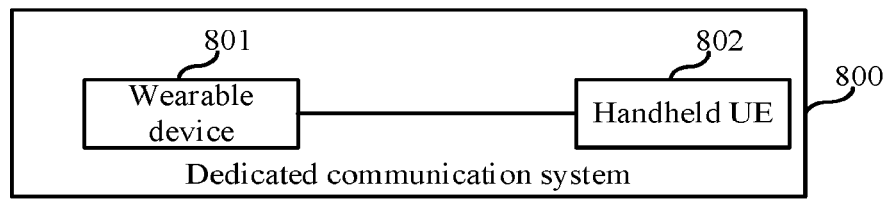
FIG. 8 shows a block diagram of a dedicated communication system according to an embodiment of the present disclosure.

FIG. 8 shows a block diagram of a dedicated communication system 800 according to an embodiment of the present disclosure. As shown in FIG. 8, the communication system 800 includes a wearable device 801 and a handheld user equipment 802. The wearable device 801 is bound to handheld user equipment 802 through near field communication; then sends a first request message to the handheld user equipment 802 to acquire a communication resource; receives a communication resource allocated for it from the handheld user equipment 802; and communicate with the base station based on the allocated communication resource.

In some embodiments, the allocated communication resource includes the communication resource that the handheld user equipment 802 changing at least a part of the acquired communication resource to which used by the wearable device 801. The changing may include changing at least a part of the grant-free resource acquired by the handheld user equipment to the PUR resource used by the handheld user equipment.

In some embodiments, a communication resource change request is sent to the base station through the handheld user equipment, and the change request may at least include the identifier (ID) or index of the wearable device; a change response from the base station is received; and at least a part of communication resource acquired by the handheld user equipment is changed to the communication resource of wearable devices. In some embodiments, the change request further includes at least one of the following: the wearable device identifier, the amount of data to be transmitted, the estimated transmission time, the service characteristic, the logical channel identifier ID, the requested TA, and the changed communication resource; where, the service characteristic includes at least one of packet interval and packet size.

In a possible implementation manner, a second request message for acquiring the communication resource is sent to the base station through the handheld user equipment, where the second request message may at least include an indication representing that the communication resource requested to be acquired is for the wearable device, and the ID or index of the wearable device; a first response message is received from the base station; and a second response message is sent to the wearable device through the handheld user equipment based on the first response message. The second request message may further include at least one of the following: the amount of data to be transmitted, the estimated transmission time, the service characteristic, the logical channel ID, and the requested TA; where, the service characteristic include at least one of packet interval and packet size.

Figure 9:
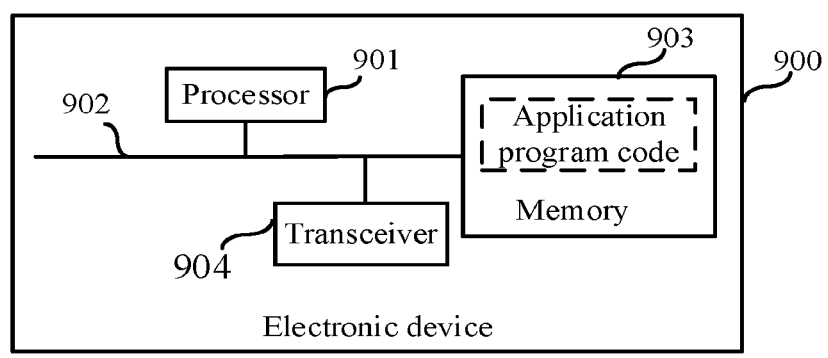
FIG. 9 shows a schematic structural diagram of an electronic device according to an embodiment of the present disclosure.

FIG. 9 shows a schematic structural diagram of an electronic device according to an embodiment of the present disclosure. As shown in FIG. 9, the electronic device 900 includes: a processor 901 and a memory 903, where, the processor 901 is connected to the memory 903, for example, through a bus 902. Further, the electronic device 900 may also include a transceiver 904. It should be noted that, in practical applications, the transceiver 904 is not limited to one, and the structure of the electronic device 900 does not constitute a limitation to the embodiments of the present disclosure.

Among them, the processor 901 is used in the embodiments of the present disclosure to implement the functions of each module shown in FIG. 4, and may also be used to implement the functions of each module shown in FIG. 7. The transceiver 904 includes a receiver and a transmitter, and the transceiver 904 is used in the embodiments of the present disclosure to implement a transceiver function.

The processor 901 may be a CPU, a general purpose processor, a DSP, an ASIC, an FPGA or other programmable logic device, transistor logic device, hardware component, or any combination thereof. It may implement or execute the various exemplary logical blocks, modules and circuits described in connection with this disclosure. The processor 901 may also be a combination that implements computing functions, such as a combination of one or more microprocessors, a combination of a DSP and a microprocessor, and the like.

The bus 902 may include a path to transfer information between the components described above. The bus 902 may be a PCI bus, an EISA bus, or the like. The bus 902 can be divided into an address bus, a data bus, a control bus, and the like. For ease of presentation, one thick line is used in FIG. 9, but it does not mean that there is one bus or one type of bus.

The memory 903 can be a ROM or other types of static storage device that can store static information and instructions, a RAM or other types of dynamic storage device that can store information and instructions, or EEPROM, CD-ROM or other optical disk storage, optical disk storage (including compact disc, laser disc, optical disc, digital versatile disc, Blu-ray disc, etc.), magnetic disk storage media or other magnetic storage device, or any other medium capable of carrying or storing desired program code in the form of instructions or data structures and capable of being accessed by a computer, which is not limited to this.

The memory 903 is used to store the application program code for executing the solution of the present disclosure, and being executed controlled by the processor 901. The processor 901 is configured to execute the application program code stored in the memory 903 to implement the actions of the wearable device provided by the embodiments as shown in FIG. 4, or the actions of the handheld user equipment as shown in FIG. 7.

Embodiments of the present disclosure provide a computer-readable storage medium, where a computer program is stored on the computer-readable storage medium, and when the program is executed by a processor, the methods shown in the foregoing embodiments are implemented. Among them: considering that the position of the watch relative to the user's handheld device is a relatively fixed relationship, the present disclosure proposes a method for using the user's handheld device to assist the wearable device in scheduling to reduce the control signaling overhead required for the wearable device during scheduling, thereby saving the signaling overhead of the wearable device and reducing its complexity. At the same time, the network also saves a lot of signaling overhead being repeated transmitted required for wearable device communication.

The computer-readable storage medium provided by the embodiments of the present disclosure is applicable to any embodiments of the foregoing method.

Other embodiments of the present disclosure will readily occur to those skilled in the art upon consideration of the specification and practice of the present disclosure. This disclosure is intended to cover any variations, uses, or adaptations of the present disclosure that follow the general principles of the present disclosure and include common knowledge or techniques in the technical field not disclosed by the present disclosure. The specification and examples are to be regarded as exemplary only, with the true scope and spirit of the disclosure being indicated by the following claims.

It is to be understood that the present disclosure is not limited to the precise structures described above and illustrated in the accompanying drawings, and that various modifications and changes may be made without departing from the scope thereof. The scope of the present disclosure is limited only by the appended claims.

According to a first aspect of the present disclosure, there is provided a method for a wearable device to acquire a communication resource. The method includes: sending a request message for acquiring the communication resource to a handheld user equipment; receiving the communication resource allocated by the handheld user equipment for the wearable device; and communicating with a base station based on the allocated communication resource.

According to some embodiments of the present disclosure, before sending the request message for acquiring the communication resource to the handheld user equipment, the method further includes: establishing a binding connection with the handheld user equipment by a predetermined communication manner, where the predetermined communication manner includes at least one of the follows: Bluetooth, WiFi, and NFC near field communication.

According to some embodiments of the present disclosure, the establishing the binding connection with the handheld user equipment by the predetermined communication manner includes: establishing the binding connection with the handheld user equipment by the predetermined communication manner through a predetermined application layer protocol.

According to some embodiments of the present disclosure, the request message includes at least one of the follows: a wearable device identifier, an amount of data to be transmitted, an estimated transmission time, a service characteristic, a logical channel identifier, and a requested timing advance (TA); where, the service characteristic includes at least one of a packet interval and a packet size.

According to some embodiments of the present disclosure, the communication resource includes at least one of a time domain resource, a frequency domain resource and a space domain resource for communicating with the base station.

According to some embodiments of the present disclosure, the communication resource includes a TA value for communication with the base station; and the communicating with the base station based on the allocated communication resource includes: communicating with the base station based on an acquired TA value of the handheld user equipment.

According to some embodiments of the present disclosure, the communication resource further includes a preconfigured uplink resource (PUR), and the communicating with the base station based on the allocated communication resource includes: transmitting data with the base station in an idle state and/or an inactive state according to the PUR resource.

According to some embodiments of the present disclosure, the receiving the communication resource allocated by the handheld user equipment for the wearable device includes any one of follows: receiving a changed communication resource sent by the handheld user equipment, where the changed communication resource is a communication resource allocated for the wearable device by the handheld user equipment changing at least a part of acquired communication resource; and receiving an applied communication resource sent by the handheld user equipment, where the applied communication resource is a communication resource applied by the handheld user equipment to the base station for the wearable device.

According to a second aspect of the present disclosure, there is provided a method for a handheld user equipment to allocate a communication resource, the method includes: receiving a first request message for acquiring the communication resource from a wearable device; and sending the allocated communication resource to the wearable device in response to the first request message.

According to some embodiments of the present disclosure, before receiving the first request message for acquiring the communication resource from the wearable device, the method further includes: establishing a binding connection with the wearable device by a predetermined communication manner, where the predetermined communication manner includes at least one of the follows: Bluetooth, WiFi, and NFC near field communication.

According to some embodiments of the present disclosure, the method further includes: allocating the communication resource for the wearable device in response to detecting a binding connection being established with the wearable device.

According to some embodiments of the present disclosure, the sending the allocated communication resource to the wearable device in response to the first request message includes: allocating the communication resource for the wearable device in response to the first request message; and sending the allocated communication resource to the wearable device.

According to some embodiments of the present disclosure, the allocating the communication resource for the wearable device includes at least one of follows: changing at least a part of communication resource acquired by the handheld user equipment to the communication resource allocated for the wearable device; and sending a communication resource acquisition request applied for the wearable device to the base station, and receiving the communication resource allocated for the wearable device returned by the base station.

According to some embodiments of the present disclosure, the changing at least a part of communication resource acquired by the handheld user equipment to the communication resource allocated for the wearable device includes: sending a communication resource change request to the base station; receiving a communication resource change response from the base station; and determining to change at least a part of communication resource acquired by the handheld user equipment to the communication resource allocated for the wearable device according to the communication resource change response.

According to some embodiments of the present disclosure, the changing at least a part of communication resource acquired by the handheld user equipment to the communication resource allocated for the wearable device includes: changing at least a part of grant-free resource acquired by the handheld user equipment to a PUR resource allocated for the wearable device.

According to some embodiments of the present disclosure, the change request includes at least one of follows: a wearable device identifier, an amount of data to be transmitted, an estimated transmission time, a service characteristic, a logical channel identifier ID, a requested TA, and a changed communication resource; where, the service characteristic includes at least one of a packet interval and a packet size.

According to some embodiments of the present disclosure, the communication resource includes at least one of a time domain resource, a frequency domain resource and a space domain resource for communicating with the base station.

According to a third aspect of the present disclosure, there is provided a wearable device. The wearable device includes: a binding module, configured to bind with a handheld user equipment by a predetermined communication manner; a sending module, configured to send a request message for acquiring a communication resource to the handheld user equipment; a receiving module, configured to receive an allocated communication resource sent by the handheld user equipment; and a communication module, configured to communicate with a base station based on the allocated communication resource.

According to a fourth aspect of the present disclosure, there is provided a wearable device. The wearable device includes: a memory, storing a computer-executable instruction thereon; and one or more processors coupled to the memory, when the computer-executable instruction is executed by the one or more processors, cause to send a request message for acquiring the communication resource to a handheld user equipment; receive the communication resource allocated by the handheld user equipment for the wearable device; and communicate with a base station based on the allocated communication resource.

According to a fifth aspect of the present disclosure, there is provided a handheld user equipment, including: a binding module, configured to bind with a wearable device by a predetermined communication manner; a receiving module, configured to receive a request message from the wearable device for acquiring a communication resource; and a sending module, configured to send an allocated communication resource to the wearable device in response to the request message.

According to a sixth aspect of the present disclosure, there is provided a handheld user equipment, including: a memory, storing a computer-executable instruction thereon; and one or more processors, coupled to the memory, when the computer-executable instruction is executed by the one or more processors, cause to receive a first request message for acquiring the communication resource from a wearable device; and send the allocated communication resource to the wearable device in response to the first request message.

According to a seventh aspect of the present disclosure, there is provided a non-transitory computer-readable storage medium, storing a computer program thereon, when the program is executed by a processor, any one of the above methods is implemented.

Considering that the position of the watch relative to the user's handheld device is in a relatively fixed relationship, the present disclosure proposes a method for using the user's handheld device to assist wearable devices in scheduling to reduce the control signaling overhead required for the wearable device during scheduling, thereby saving the signaling overhead of the wearable device and reducing its complexity. At the same time, the network also saves a lot of signaling overhead being repeated transmitted required for wearable device communication.

What is claimed is:

1. A method for a wearable device to acquire a communication resource, the method comprising:
   sending a first request message for acquiring the communication resource to a handheld user equipment;
   receiving the communication resource allocated by the handheld user equipment for the wearable device; and
   communicating with a base station based on the communication resource;
   wherein the communication resource is allocated by the handheld user equipment in response to the first request message by:
   sending a communication resource change request to the base station;
   receiving a communication resource change response from the base station; and
   determining to change at least a part of communication resource acquired by the handheld user equipment to the communication resource allocated for the wearable device according to the communication resource change response.

2. The method according to claim 1, further comprising:
   establishing a binding connection with the handheld user equipment by a predetermined communication manner through a predetermined application layer protocol.

3. The method according to claim 1, wherein the request message comprises at least one of follows: a wearable device identifier, an amount of data to be transmitted, an estimated transmission time, a service characteristic, a logical channel identifier, and a requested timing advance (TA);
   wherein, the service characteristic comprises at least one of a packet interval and a packet size.

4. The method according to claim 1, wherein the communication resource comprises at least one of a time domain resource, a frequency domain resource and a space domain resource for communicating with the base station.

5. The method according to claim 1, wherein the communication resource comprises a TA value for communication with the base station; and the communicating with the base station based on the communication resource comprises:
   communicating with the base station based on an acquired TA value of the handheld user equipment.

6. The method according to claim 1, wherein the communication resource further comprises a preconfigured uplink resource (PUR), and the communicating with the base station based on the communication resource comprises:
   transmitting data with the base station in an idle state and/or an inactive state according to the PUR resource.

7. The method according to claim 1, wherein the receiving the communication resource allocated by the handheld user equipment for the wearable device further comprises:
   receiving an applied communication resource sent by the handheld user equipment, wherein the applied communication resource is a communication resource applied by the handheld user equipment to the base station for the wearable device.

8. A method for a handheld user equipment to allocate a communication resource, the method comprising:
   receiving a first request message for acquiring the communication resource from a wearable device;
   allocating the communication resource for the wearable device in response to the first request message; and
   sending the communication resource to the wearable device;
   wherein allocating the communication resource for the wearable device comprises:
   sending a communication resource change request to the base station;
   receiving a communication resource change response from the base station; and
   determining to change at least a part of communication resource acquired by the handheld user equipment to the communication resource allocated for the wearable device according to the communication resource change response.

9. The method of claim 8, further comprising:
   allocating the communication resource for the wearable device in response to detecting a binding connection being established with the wearable device.

10. The method of claim 8, further comprising:
    sending a communication resource acquisition request applied for the wearable device to the base station, and receiving the communication resource allocated for the wearable device returned by the base station.

11. The method according to claim 8, wherein the allocating the communication resource for the wearable device further comprises:

changing at least a part of grant-free resource acquired by the handheld user equipment to a PUR resource allocated for the wearable device.

12. The method of claim 8, wherein the change request comprises at least one of follows:

a wearable device identifier, an amount of data to be transmitted, an estimated transmission time, a service characteristic, a logical channel identifier ID, a requested TA, and a changed communication resource;

wherein, the service characteristic comprises at least one of a packet interval and a packet size.

13. The method according to claim 10, wherein the sending the communication resource acquisition request applied for the wearable device to the base station comprises:

sending a second request message for acquiring the communication resource to the base station, wherein the second request message at least comprises an indication representing that the communication resource requested to be acquired is for the wearable device, and an ID or index of the wearable device;

receiving a first response message from the base station; and sending a second response message to the wearable device based on the first response message.

14. The method according to claim 13, wherein the second request message further comprises at least one of follows: an amount of data to be transmitted, an estimated transmission time, a service characteristic, a logical channel identifier ID, and a requested TA;

wherein, the service characteristic comprises at least one of a packet interval and a packet size.

15. The method according to claim 8, wherein the communication resource comprises at least one of a time domain resource, a frequency domain resource and a space domain resource for communicating with the base station.

16. A wearable device comprising:

a memory, storing a computer-executable instruction thereon; and one or more processors, coupled to the memory, when the computer-executable instruction is executed by the one or more processors, a method for a wearable device to acquire a communication resource is implemented, wherein the method comprises:

sending a first request message for acquiring the communication resource to a handheld user equipment;

receiving the communication resource allocated by the handheld user equipment for the wearable device; and communicating with a base station based on the communication resource;

wherein the communication resource is allocated by the handheld user equipment in response to the first request message by:

sending a communication resource change request to the base station;

receiving a communication resource change response from the base station; and determining to change at least a part of communication resource acquired by the handheld user equipment to the communication resource allocated for the wearable device according to the communication resource change response.

\* \* \* \* \*